Feb. 24, 1970 S. KESSLER Re. 26,801

ELECTRICAL RELAY

Original Filed June 16, 1966

Inventor
Seymour Kessler
By John J. Pederson
Attorney

United States Patent Office

Re. 26,801
Reissued Feb. 24, 1970

26,801
ELECTRICAL RELAY

Seymour Kessler, Wilmette, Ill., assignor to Zenith Radio Corporation, Chicago, Ill., a corporation of Delaware Original No. 3,373,385, dated Mar. 12, 1968, Ser. No. 558,077, June 16, 1966. Application for reissue Feb. 19, 1969, Ser. No. 807,465
Int. Cl. H01h *51/08*
U.S. Cl. 335—138 11 Claims

Matter enclosed in heavy brackets [ ] appears in the original patent but forms no part of this reissue specification; matter printed in italics indicates the additions made by reissue.

ABSTRACT OF THE DISCLOSURE

[A latching electromagnetic relay which is stable in at least two modes of contact operation, including a coil and core assembly, a pivoted armature for attraction by the core and including at least one contact for movement by said armature; said armature further including a projecting tip directly cooperating with a pair of concentric cam tracks formed on a rotatable index wheel, said tracks being shaped to step the index wheel upon each movement of the armature, and to act as a changeable armature position stop to control the position of said contact after each successive step of rotation of said index wheel.]

*A bi-stable relay which may be actuated with considerably less power than that required for conventional bistable relays. The relay comprises an electromagnet, an armature mounted for movement in response to energization of the electromagnet, and an index means rotationally movable with respect to an axis. The index means has a continuous groove which it provided with reference notches at different radial displacements from the axis and which is further provided with cam surfaces displaced from the notches and engageable to rotate the index means with respect to the axis. One end of the pin is attached to the armature and its other end is captivated in the groove for engaging the cam surfaces to rotate the index wheel with respect to the axis and thereby transfer the pin from one to another of the notches in response to each energization and de-energization sequence of the electromagnet. Electrical contacts are operatively associated with the armature so that they are responsive to the position of the armature when the electromagnet is de-energized for selectively opening and closing an electrical circuit.*

The present invention relates to an electrical relay which is stable in at least two modes and more particularly to a simplified bistable relay.

An electromagnetic bistable relay is a device in which a pair of contacts remain in either an "open" or "closed" position when the relay is stable, i.e., when the electromagnet is deenergized. Such devices are widely used in various applications when it is desired to control the operation of an electrical circuit each time an electrical impulse is supplied from a source. For example, the remotely controlled television art utilizes a remote transmitter which produces a signal, representative of a desired control function, which is transmitted to a televison receiver and converted into an electrical impulse by a microphone. The electrical impulse is amplified and, according to its predetermined frequency, is utilized to operate one or more control functions. One of the most common remotely controlled functions in a television receiver is the on-off function where it has been the general practice heretofore to utilize a first electrical relay, driven directly off of the final amplifier stage of the receiver, to pulse a second larger bistable relay which is serially connected to the television receiver power line. The use of a pair of relays to perform this function is necessitated by the small amount of power produced by the remote control receiver and by the relatively large amount of power required to operate a conventional bistable relay. The first relay, being monostable and capable of operating from the low power produced by the remote control receiver, is utilized to supply the larger amount of power needed to operate the conventional bistable relay. In the past, such bistable relays have generally required approximately 10 watts of power to operate the electromagnet necessary to actuate an armature with sufficient force to produce the necessary bistable action. Although bistable relays have been developed which require somewhat less power for energization, these relays are characterized by fragile outboard resilient members and friction producing members which require great care both in handling and use.

Accordingly, the purpose of the present invention is to provide an electrical bistable relay which requires a small amount of power to energize the electromagnet and operate the relay in a bistable manner, yet which is extremely rugged and reliable. The relay of the present invention, therefore, may replace both of the previously used relays in a television remote control system since it can be operated directly by the remote control amplifier in a bistable manner and can control a circuit requiring a considerable amount of power. In addition. the present relay requires considerably less chassis space than conventional bistable relays, particularly when a second monostable relay was required.

An object of the present invention, therefore, is the provision of an electrical relay which is stable in at least two modes.

Another object is to provide an electrical bistable relay which requires only a small amount of operating power.

A further object of the invention is the provision of an electrical bistable relay which is extremely rugged and reliable.

Still another object is to provide a miniature bistable relay which is characterized by simplicity of construction, low cost and ease of operation and use.

In accordance with *a preferred embodiment of* the present invention, an electrical relay which is stable in at least two modes is comprised of an electromagnet having an armature mounted for movement in response to energization of the electromagnet. Index means, mounted for rotation about an axis and having a continuous groove therein defining first and second radially spaced cam tracks with the second cam track having a plurality of radially and circumferentially spaced notches, are provided together with pin means actuated by the armature for sequentially engaging the first and second cam tracks to rotate the index means, the pin means and the notches cooperating to fix the position of the armature upon deenergization of the electromagnet. In addition, contact means, responsive to the position of the armature when the electromagnet is deenergized, are provided for controlling the flow of current through an electrical circuit.

*In its broader aspects, the bi-stable electrical relay of the invention comprises an electromagnet and an armature mounted for movement in response to energization of the electromagnet. Index means rotationally movable with respect to an axis are included with the index means having a continuous groove therein provided with reference notches at different radial displacements from the axis and further provided with cam surfaces displaced from the notches and engageable to rotate the index means with respect to the axis. Also provided are pin means captivated in the groove and actuated by the armature for engaging the cam surfaces to rotate the index means with respect to the axis and transfer the pin means from one to another of the notches in response to each energization and de-*

*energization sequence of the electromagnet. Contact means responsive to the position of the armature when the electromagnet is de-energized are included for selectively opening and closing the electrical circuit.*

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 3a is a sectional view of a portion of the invention taken along the lines 3a—3a of FIGURE 2a;

Figure 1:
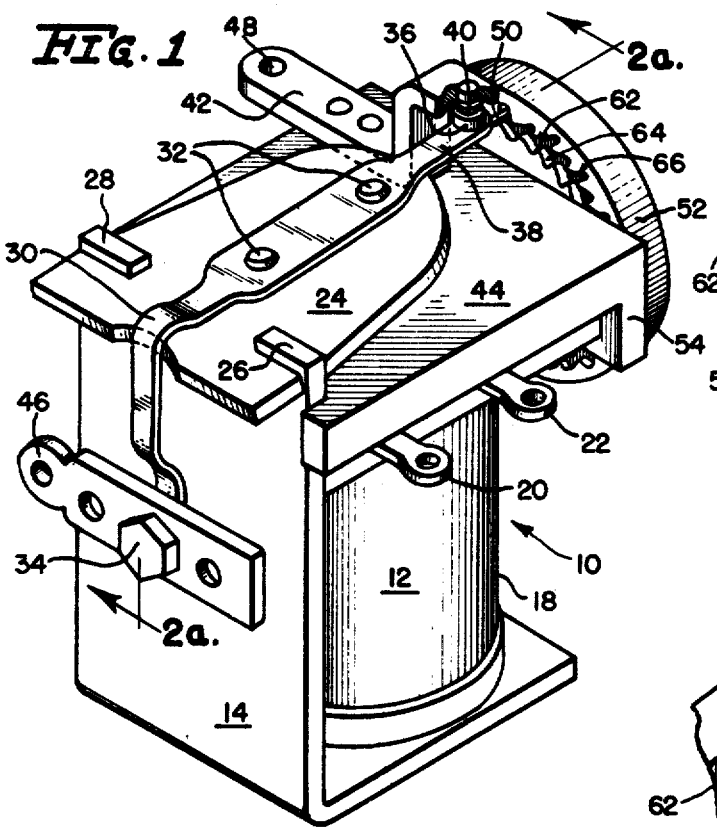
FIGURE 1 is an enlarged perspective view of a preferred embodiment of the invention.
Figure 2A:
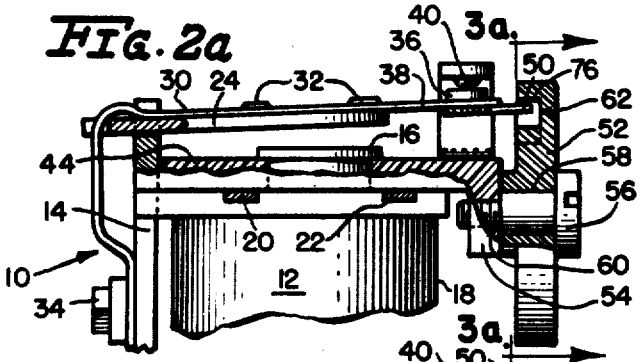
FIGURE 2 is a partial sectional view taken on the lines 2a—2a of FIGURE 1 showing the relay in a first operating position.
FIGURE 2b is a partial sectional view similar to FIGURE 2a showing the relay in a second operating position.
Figure 2B:
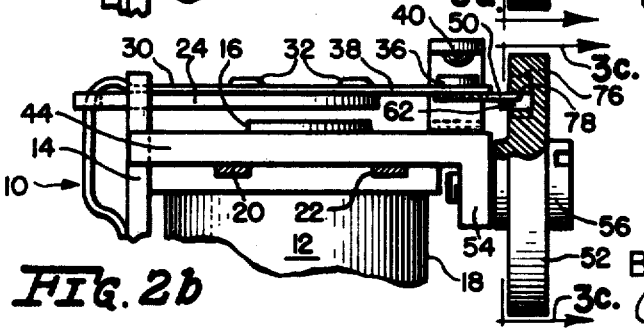

Referring now to the drawings, there is shown in FIGURES 1, 2a and 2b an electrical bistable relay 10 comprising an electromagnet 12 secured within a U-shaped frame 14. The electromagnet 12 is comprised of a core 16 of magnetic material surrounded by a coil 18 terminating in a pair of terminals 20 and 22. An armature 24, also formed of a magnetic material, is pivotally mounted on frame 14 between projections 26 and 28 formed on the frame 14. The armature 24 is spring biased in a direction away from the electromagnet 12 by a resilient armature spring 30 which is secured to the armature 24 by a pair of rivets 32 and to the frame 14 by a threaded fastener 34. A first contact 36 is secured to a projecting portion 38 of the armature spring 30 for movement with the armature 24 and a second contact 40 is carried by an essentially L-shaped bracket 42 which is secured, as by riveting, to the upper leg 44 of the frame 14. A first terminal lug 46 is electrically connected to the first contact 36 through the armature spring 30 while a second terminal lug 48 is electrically connected to the second contact 40 through the bracket 42. The upper leg 44 of the U-shaped frame 14 is constructed of an electrically insulative material, such as plastic, so that the terminal lugs 46 and 48 are insulated from one another. An armature pin 50 is secured to the projecting portion 38 of the armature spring 30 by welding or soldering as illustrated, or may be formed integral therewith.

Figure 3A:
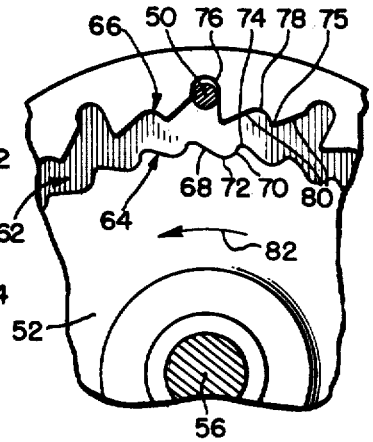
Figure 3B:
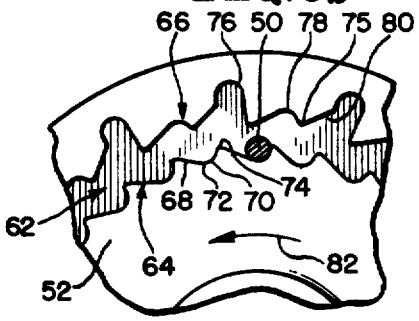
FIGURE 3b is a sectional view similar to FIGURE 3a but showing the invention in a partially actuated position.

As set forth above, the present invention provides a bistable relay which, when the electromagnet is deenergized, will remain in either an "on" or "off" condition. To accomplish this, an index wheel 52 is rotatably secured to a depending flange portion 54 of the upper leg 44 by a threaded fastener 56 passing through an aperture 58 in the index wheel 52 and threadedly engaging a threaded bore 60 in the depending flange 54. The index wheel 52, therefore, is freely rotatable about an axis which is normal to the plane through which the armature 24 pivots. As best illustrated in FIGURES 3a, b and c, the index wheel 52 is provided with a continuous groove 62 formed in its inner face which defines a pair of concentric cam tracks 64, 66, with the first cam track 64 being inboard, with respect to the axis of rotation of the index wheel 52, of the second cam track 66. The first cam track 64 is formed generally of a modified saw-tooth configuration having inclined wall portions 68 and substatnially radially extending wall portions 70, the wall portions 68 and 70 being interconnected by rounded root portions 72 and forming a plurality of tooth peaks 74. The second cam track 66 is comprised essentially of series of alternately deep and shallow notches 76 and 78, respectively, interconnected by a series of wall portions 80 inclined in a direction opposite to that of the inclined wall portions 68 of the first cam track 64 and forming a series of tooth peaks 75. As illustrated in the drawings, the center of the notches 76 and 78 in the second cam track 66 are in radial alignment with the inclined wall portions 68 of the first cam track 64 while the center of the root portions 72 of the first cam track 64 are in radial alignment with the inclined wall portions 80 of the second cam track 66. The free end of the armature pin 50 is disposed within the continuous groove 62 for the purpose of indexing the index wheel 52 and controlling the position of the armature 24 and, consequently, the position of the first contact 36 with respect to the second fixed contact 40.

In operation of the relay 10, the electromagnet terminals 20, 22 may be connected to any suitable command source which is capable of providing sufficient power to energize the electromagnet 12 and cause the armature 24 to be attracted thereto. In an actual embodiment of the relay 10, is has been found that an impulse of 150 milliwatts is sufficient to actuate the electromagnet 12 and armature 24 as compared with approximately 10 watts necessary to actuate conventional prior art bistable relays. The contact terminal lugs 46 and 48 may be connected to any desired electrical circuit for which a bistable control is desired. For example, as set forth above, the relay 10 may be utilized to control the on-off function of a remotely controlled television receiver and, in this case, the terminals 20, 22 would be connected to the remote control receiver output and the terminals 46, 48 would be connected in series with the television receiver power line.

Figure 3C:
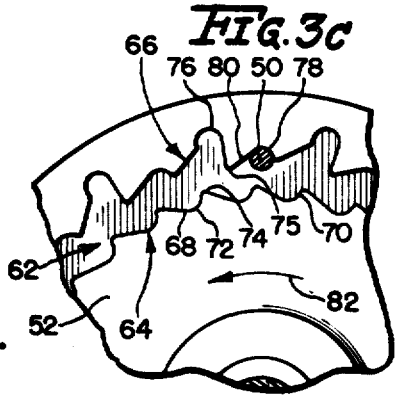
FIGURE 3c is a sectional view similar to FIGURE 3a taken along the lines 3c—3c of FIGURE 2b.

Upon the application of a pulse of current to the electromagnet 12, the armature 24 is attracted to the core 16 and, as viewed in FIGURE 3a, the armature pin 50 is caused to move downwardly in a radial trajectory towards the inclined wall portion 68 of the first cam track 64. As the armature pin 50 engages the inclined wall portion 68 of the first cam track 64, the index wheel 52 is caused to rotate in the direction indicated by arrow 82 until the armature pin 50 is seated in the root portion 72. Since the electromagent 12 is energized by a pulse of relatively short duration, the armature 24, upon discontinuance of the energizing pulse, is caused to pivot away from the core 16 of the electromagnet 12 by the resilient armature spring 30, thereby causing the armature pin 50 to travel upwardly in a radial trajectory towards the inclined wall portion 80 of the second cam track 66. As the armature pin 50 engages the inclined wall portion 80, the index wheel 52 is again caused to rotate in the direction indicated by the arrow 82 until the armature pin 50 is seated in either the notch 76 or 78. When the armature pin 50 is seated in the deeper notch 76, as illustrated in FIGURES 2a and 3a, the first contact 36 carried by the armature 24 is in intimate engagement with the second contact 40 thereby closing the electrical circuit established between terminal lugs 46 and 48. In this mode of operation, it should be noted that a clearance is provided between the armature pin 50 and the top of the notch 76 so that the first and second contacts 36 and 40 are fully engaged. Upon the next successive pulse of current to the electromagnet 12, the armature pin 50 will again trace the line of travel indicated in FIGURES 3a, b and c but will come to rest in the shallow notch 78 in the second cam track 66. In this position, as illusrated in FIGURES 2b and 3c, the first and second contacts 36 and 40 are held apart by the notch 78 so that the circuit connected between the terminals 46 and 48 is interrupted. As the electromagnet 12 is successively energized by pulses of current, the armature pin 50 will sequentially come to rest in the deep and shallow notches 76 and 78, respectively, thereby "making" and "breaking" the circuit connected between the terminals 46 and 48.

Of course, the upper cam track 66 may be programmed to provide operational modes other than as illustrated. For example, if it is desired to provide an on-on-off control function, the notches 76 and 78 would be configured so as to provide a plurality of successive deep notches followed by a shallow notch. It should also be noted that the index wheel 52 be cammed and caused to rotate in the direction of arrow 82 on both the downward and upward stroke of the armature pin 50 since the armature 50 must avoid the peaks 74 and 75 of the respective first and second cam tracks 64 and 66 to be in radial alignment with the inclined wall portions 68 and 80. The armature pin 50, therefore, sequentially engages the inclined wall portions 68 and 80 to index the index wheel 52 in the direction of the arrow 82 and must further cooperate with the series of notches 76 and 78 to fix the position of the armature 24 and, consequently, the contacts 36 and 40 when the electromagnet 12 is deenergized. As set forth above, the upward travel of the armature 24 is limited by the contacts 36 and 40 when the armature pin 50 is in the deep notch 76 and by the notch 78 itself when the armature pin 50 is in the shallow notch 78.

There has thus been described an electrical bistable relay which is capable of operating from substantially less power than is possible with prior art bistable relays, yet which is extremely rugged and reliable and does not require the use of fragile outboard spring means.

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. An electrical relay which is stable in at least two modes, said relay comprising:

an electromagnet;

an armature mounted for movement in response to energization of said electromagnet;

index means mounted for rotation about an axis, said index means having a continuous generally concentric groove therein defining first and second radially spaced cam tracks, said second cam track being provided with a plurality of circumferentially spaced notches some of differing radial depths;

pin means actuated by said armature for sequentially engaging said first and second cam tracks to rotate said index means, said pin means and said notches cooperating to fix distinct positions of said armature in response to sequences of deenergization of said electromagnet; and contact means, responsive to the position of said armature when said electromagnet is deenergized, for selectively opening and closing an electrical circuit.

2. An electrical relay in accordance with claim 1 wherein:

said first cam track is formed of a modified saw-tooth configuration with each tooth having an inclined wall portion and a generally radially extending wall portion.

3. An electrical relay in accordance with claim 2 wherein:

said second cam track comprises a series of notches interconnected by a series of wall portions, the latter being inclined in a direction opposite to that of the inclined wall portions of said first cam track.

4. An electrical relay in accordance with claim 3, with said first cam track being inboard, with respect to the axis of rotation of said index means, of said second cam track.

5. An electrical relay in accordance with claim 4 wherein:

the centers of the notches in said second cam track are in radial alignment with the inclined wall portions of the first cam track.

6. An electrical relay in accordance with claim 5 wherein:

the series of notches in said second cam track comprise alternate deep and shallow notches, said deep notches extending a first predetermined distance from the axis of said index means and said shallow notches extending a second and lesser predetermined distance from the axis of said index means.

7. An electrical relay in accordance with claim 1 wherein:

said pin means is secured to said armature; and said contact means comprise a pair of contacts, one of which is formed on said armature for movement therewith and the other of which is fixed with respect to said armature.

8. An electrical relay in accordance with claim 7 wherein:

said armature is spring biased in a direction away from said electromagnet and is restrained from movement in that direction by said contacts when said pin means is disposed in one of said notches and by said notches when said pin means is disposed in another of said notches.

9. An electrical relay in accordance with claim 8 wherein:

said electromagnet is mounted in a U-shaped frame; and said index means comprises an index wheel rotatably mounted on said frame about an axis normal to the plane through which said armature moves.

10. An electrical bistable relay capable of being actuated by an input power of less than one watt, which relay comprises:

a U-shaped frame, one leg of which is constructed of an electrically insulative material;

an electromagnet secured to said frame with its longitudinal axis being normal to the longitudinal axis of said insulative leg;

an armature mounted on said frame adjacent said insulative leg for pivotal movement about an axis, said armature being attracted towards said electromagnet when the latter is energized;

a resilient spring secured to said armature and to said frame for urging said armature away from said electromagnet when the latter is deenergized;

an index wheel mounted on said frame for rotation about an axis normal to the axis of said armature, said index wheel having a continuous groove formed in its inner face defining first and second concentric radially spaced cam tracks, said first cam track being formed of a modified saw-tooth configuration having a plurality of successive inclined and radial wall portions joined by a plurality of rounded root portions, said second cam track being formed of a plurality of alternately deep and shallow notches joined by a plurality of inclined wall portions, the inclination of the latter being in a direction opposite to the inclination of the first cam track inclined wall portions, said notches being in radial alignment with the inclined wall portions of said first cam track;

an armature pin secured to said armature for movement therewith, the free end of said pin being disposed in said continuous groove for sequentially engaging the inclined wall portions of said first and second cam tracks to rotate said index wheel upon movement of said armature towards and away from said electromagnet, said pin being seated in said notches upon deenergization of said electromagnet to fix the position of said armature when said electromagnet is deenergized; and a first contact secured to said armature and a second contact secured to said insulative frame leg, said first and second contacts being in intimate engagement when said armature pin is seated in one of said deep notches and being separated when said armature pin is seated in one of said shallow notches, whereby the flow of current through an electrical circuit in series with said contacts may be controlled.

*11. A bi-stable electrical relay for selectively opening and closing an electrical circuit, comprising:*

*an electromagnet;*

*an armature mounted for movement in response to energization of said electromagnet;*

*index means rotationally movable with respect to an axis, said index means having a continuous groove therein provided with reference notches at different radial displacements from said axis and further provided with cam surfaces displaced from said notches and engageable to rotate said index means with respect to said axis;*

*pin means captivated in said groove and actuated by said armature for engaging said cam surfaces to rotate said index means with respect to said axis and*

*transfer said pin means from one to another of said notches in response to each energization and de-energization sequence of said electromagnet; and*

*contact means, responsive to the position of said armature when said electromagnet is de-energized, for selectively opening and closing said electrical circuit.*

References Cited

The following references, cited by the Examiner, are of record in the patented file of this patent or the original patent.

UNITED STATES PATENTS

| | | | |
|---|---|---|---|
| 1,313,438 | 8/1919 | Westcott | 335—189 |
| 2,544,330 | 3/1951 | Koenig | 335—140 X |
| 2,912,543 | 10/1959 | Hawkins | 335—140 X |
| 3,147,917 | 9/1964 | Wehrli et al. | |

BERNARD A. GILHEANY, Primary Examiner

H. BROOME, Assistant Examiner